THREE-DIMENSIONAL DISPLAY
Filed May 1, 1961
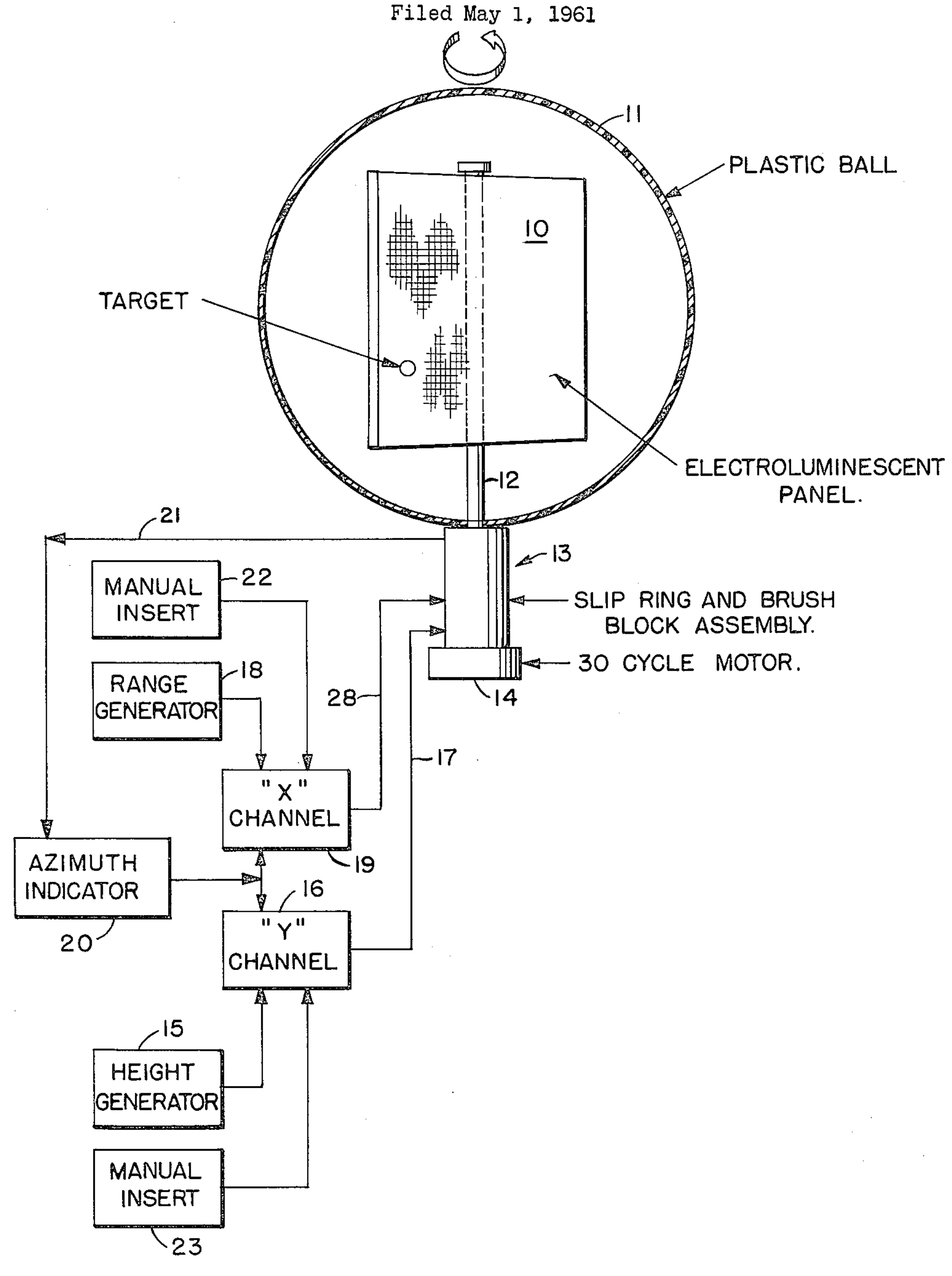
INVENTORS.
ROBERT J. SCHIPPER.
JOHN L. CODDINGTON.
BY Alden D. Redfield
Charles M. Hogan
ATTORNEYS.

United States Patent Office 3,097,261

Patented July 9, 1963

3,097,261

THREE-DIMENSIONAL DISPLAY

Robert J. Schipper, South Fort Mitchell, Ky., and John L. Coddington, Cincinnati, Ohio, assignors to Avco Corporation, Cincinnati, Ohio, a corporation of Delaware Filed May 1, 1961, Ser. No. 106,742

11 Claims. (Cl. 178—6.5)

The present invention relates to tridimensional display devices, and provides a device of a radically simplified and fundamentally unique character.

Prior art three-dimensional display devices or indicators are represented by the following United States patents: No. 2,967,905 to Hirsch, entitled "Three Dimensional Display Apparatus," issued January 10, 1961; No. 2,604,607 to Howell, entitled "Three-Dimensional Indicator Tube and Circuit Therefor," issued July 22, 1952; No. 2,806,216 to Fryklund, entitled "Three-Dimensional Position-Indicating Systems," issued September 10, 1957; No. 2,361,-390 to Ferrill, entitled "Stereo Indicator," issued October 31, 1944.

In general the three-dimensional displays of the prior art utilize dual projection systems or stereo vision aids.

An object of the present invention is to provide a three-dimensional display device or indicator which is free of the limitations imposed by cathode ray tubes and other high vacuum enclosures and which offers the further advantages of simplification, manufacturing cost economies, reliable operation and ready maintenance, reduced voltages, and elimination of complex mirrors, reflectors, and optical devices of that character.

Another object of the present invention is to exploit a luminescent panel as a three-dimensional display device and to provide means for angularly positioning that panel in accordance with azimuth data relating to an object to be displayed or represented and means for supplying to that panel range and height data relating to that object when the angular position of the panel corresponds to the azimuth angle of the object.

In accordance with a broad aspect of the invention, there are provided a rotatably mounted $x$—$y$ matrix-type display panel, means for supplying electrical data to said panel, and means for synchronizing the supply of data with a selected angular position of the display device.

Narrowly viewed, and as used in a specific application for the three-dimensional display of an object detected by radar, the invention provides, in the preferred embodiment, the combination of an electroluminescent disk comprising a base sheet on which are mounted in succession a group of $x$ coordinate parallel conductive grids, an electroluminescent dielectric, a second group of $y$ coordinate parallel conductive grids at an angle (generally a right angle) to the first-mentioned group, and means for rotatably mounting that disk. The so-called grids are bars arranged for individual and selective excitation. The groups of grid elements define a plurality of conductor crossings, at each of which the intervening portion of the electroluminescent element can be caused to luminesce upon individual selection of the $x$ coordinate grid and the $y$ coordinate grid at that crossing. A range generator is coupled through an $x$ communication channel and a slip ring and brush block assembly to the $x$ coordinate elements. A height generator is coupled through a $y$ communication channel to the $y$ coordinates. Each channel is provided with means for selecting any desired $x$ or $y$ coordinate as dictated by the range and height generators, respectively. The channels are gated to select the desired $x$ and $y$ coordinate elements when the indicated position of the target, appearing in the output of an azimuth indicator, corresponds with the angular position of the electroluminescent disk.

For a better understanding of the present invention, together with other and further objects advantages, and capabilities thereof, reference is made to the attached single FIGURE of the drawing, which illustrates in simplified frontal view a preferred embodiment of tridimensional indicator in accordance with the invention, the associated functional circuit units being indicated in block diagram.

Referring now to the drawing, there is shown an electroluminescent disk 10. This disk or panel is of conventional construction and need not be described in detail herein. It is well known to those skilled in the art that an electroluminescent multi-element display panel comprises a base sheet, a first conductive film of parallel grid elements or conductors (which in a high-definition display may be on the order of 0.003" to 0.005" wide and spaced some 0.005" to 0.007" apart), a ceramic dielectric layer with electroluminescent phosphor dots, a layer of insulating material printed on all areas except the phosphor dots, a second conductive layer of parallel grid elements disposed at an angle (generally a right angle) to the first-mentioned elements, and a transparent insulating and sealing layer on top. The conductors are terminated for individual electrical connections prior to the sealing application. The first-named grids are the $x$ coordinate elements, and the second-named grids are the $y$ coordinate elements. When potentials are selectively applied to one of the $x$ elements and one of the $y$ elements, a bright spot of light occurs at a phosphor-dot point on the dielectric whereat the grids or energized elements cross. The construction is of the well-known sandwich type, the bottom (preferably plastic) sheet being the base element and the other elements being superimposed thereon in the succession named. While the electroluminescent panel is a typical type of $x$—$y$ coordinate matrix display device and is employed in the preferred embodiment herein shown, it will be understood by those skilled in the art that any matrix panel furnishing a visual-spot indication may be used within the scope of the present invention.

The electroluminescent panel 10 is positioned within a transparent non-evacuated plastic ball 11. The panel is secured to a shaft 12 rotatably mounted in a slip ring and brush block assembly 13 for rotation by a synchronous motor 14. The assembly 13 provides appropriate input connections to all of the $x$ and $y$ grid elements of the panel 10. That is to say, the slip rings are provided for the insertion of the electrical data information which causes the desired $x$ and $y$ coordinates, pertinent to the object being represented, to be selected. The invention is not limited to slip ring and brush block means for applying currents to the elements of the rotating panel, and any means suitable for performing that function may be used.

If one considers the range of a given object to be represented by a selected $x$ coordinate, and the height of such object to be represented by a selected $y$ coordinate, then the capability of the luminescent panel 10 to represent the height and range of an object in space in a bidimensional or planar framework of Cartesian coordinates is readily understood. Range is therefore represented by the abscissa position of a visual spot, the shaft being considered as the vertical axis of the reference framework. Similarly, the lower edge of the panel can be considered the horizontal axis of the reference framework, and the $y$ coordinate of a visual spot on the panel 10 represents the height of the object in space. In accordance with the invention, a third or polar coordinate or azimuthal position of the object in space is represented by causing the visual spot to appear on the panel only at such time as the angular position of the target in azimuth corresponds with the angular position of the panel, so that the visual spot is a true tridimensional presentation and appears in a position defined in terms of three coordinates, which in turn are specified by electrical data in accordance with the positional attributes completely definitive of the position of an object in space.

This objective is accomplished by gating to the panel the data which cause the selection of the desired $x$ and $y$ elements only when the angular position of the panel corresponds to the azimuth of the selected target.

In the specific embodiment shown, the speed of rotation of the panel is 1800 revolutions per minute. This parameter is illustrative and not by way of limitation, because the only speed requirement is that it be sufficient to eliminate flicker of displayed information. Indeed, slower speeds than 1800 revolutions per minute are preferred. The $x$ and $y$ positional data are gated to the panel only during a very small arc of panel rotation, so that the illuminated point on the panel appears as such and not as a line. The disk can be gated on every 360 degrees of rotation, or it can be gated on every 180 degrees by alternate reversal of the $x$ coordinate.

Data information is inserted automatically in synchronism wtih azimuth. For example, a height finder 15 measures the height of a target and, through $y$ channel 16 and conductor 17, furnishes to the corresponding $y$ element on panel 10 an electrical indication so that the $y$ grid is selected in accordance with the height of the target to be represented. Similarly, a range indicator 18 measures the target range and furnishes to the panel 10, via $x$ channel 19 and conductor 28, an indication of the selection of that $x$ coordinate which is representative of target range. The $x$ and $y$ channels are gated into condition to supply the aforementioned height and range data at such time as azimuth indicator 20 indicates that the angular position of the panel 10 corresponds to the angular bearing of the target. That is, the azimuth indicator 20 furnishes target angle, and, when target angle corresponds with angular position of the panel 10 as indicated electrically on line 21 (which may be the output of a potentiometer, not shown, for example), then the azimuth indicator gates channels $x$ and $y$. This action occurs repetitively once for every 360 degrees of rotation of panel 10, for example.

It will be understood from the foregoing that, whenever a target appears in azimuth, this gating action can be made to occur, so that a plurality of target indications may be furnished by the display device.

Alphanumeric symbols and reference scales can be introduced horizontally and vertically on the panel by suitable manual insertion devices 22 and 23. The casing 11 may be provided with index lines to furnish azimuth references. It is desirable that the viewer's line of sight be perpendicular to the rotating vane when it is at peak illumination.

The advantages obtained from this invention include:

(1) Direct operation without special glasses or projection systems;
(2) Simplified system for three dimensions;
(3) Reduction in cost;
(4) Greater life expectancy;
(5) Improved reliability;
(6) Reduced maintenance;
(7) Improved adaptability;
(8) Power reduction;
(9) Weight reduction;
(10) Absence of an enclosure and a gas;
(11) Absence of edgelit hotspots;
(12) Thin source area (flat face);
(13) Cool light;
(14) Non-magnetic;
(15) No parallax;
(16) Numerous display colors;
(17) No "sudden death" or "catastrophic failures";
(18) Less storage and supply requirements;
(19) Higher resolution.

While there has been shown and described what is at present considered to be the preferred embodiment of the invention, it will be apparent to those skilled in the art that various modifications and changes may be made therein without departing from the true scope of the invention as defined in the appended claims.

Having disclosed our invention, we claim:

1. A three-dimensional electrical indicator device comprising, in combination: an $x$—$y$ matrix-type luminescent panel having a plurality of $x$ inputs and a plurality of $y$ inputs, means for rotating the panel, means for supplying electrical signals representative of two positional attributes of an object in space, and means for repetitively gating said signals to selected $x$ and $y$ inputs only when the angular position of said panel is representative of a third positional attribute of said object in space, whereby a spot on the panel becomes luminescent to indicate said three positional attributes.

2. A three-dimensional electrical indicator comprising, in combination: an $x$—$y$ matrix-type device having a plurality of $x$ and $y$ inputs, means for rotating said device, means for supplying to the device electrical signals representative of two positional attributes of an object in space, and means for controlling the azimuthal position of the resultant indication in accordance with a third positional attribute of said object in space.

3. The combination of an electroluminescent disk comprising a base sheet on which are successively mounted a transparent parallel group of conductive $x$ coordinate grid elements and an electroluminescent dielectric and a second group of parallel conductive $y$ coordinate grid elements at right angles to the first-mentioned group, said groups defining a plurality of conductor crossings at which the intervening portion of the electroluminescent element can be caused to luminesce upon selection of $x$ and $y$ coordinate elements, means for rotating said disk, and means for applying to said disk electrical range and height data relating to an object in space when the angular position of the disk corresponds to the azimuth angle of said object.

4. Apparatus for the indication of three positional attributes of an object, comprising: an information means for supplying electrical data signals representative of such attributes and rotatable light-generating means responsive to said data signals for repetitively converting said electrical data signals received from said information means into a point of light on said light-generating means at any angular position of said light-generating means, said light-generating means being adapted to rotate at a rate sufficient to exhibit persisting images within the volume generated by the rotation of said light-generating means.

5. A three-dimensional electrical indicator comprising, in combination: an $x$—$y$ matrix-type luminescent panel having a plurality of $x$ inputs and a plurality of $y$ inputs, means actuated to apply to any selected $x$ and $y$ inputs electrical signals representative of two positional attributes of an object in space, whereby a point of light indicative of said two positional attributes appears on said panel, means for rotating said panel, and actuating means for synchronizing the formation of said point of light with a selected angular position of said panel.

6. A three-dimensional electrical indicator device comprising, in combination: a matrix-type luminescent panel, means for rotating said panel about an axis in the plane of the panel, and means for repetitively applying gated signals to said panel to designate a selected point for illumination.

7. A rotatably mounted $x$—$y$ matrix-type display panel, means for supplying data to said panel, and means for synchronizing said supply of data with a selected angular position of said display device.

8. An indicating device comprising a matrix-type display panel having a plurality of electrically fed $x$ coordinates and a plurality of electrically fed $y$ coordinates, means for mounting said display panel for rotation about an axis in its plane, means for applying electrical information to a selected $x$ coordinate, means for applying electrical information to a selected $y$ coordinate, and means for synchronizing the formation of a display with a selected angular position of said display panel.

9. The combination of a matrix-type luminescent panel, means for rotating said panel about an axis in its plane, and means for repetitively supplying range and height data to said panel when it traverses a selected angular position.

10. The combination of a matrix-type luminescent panel, means for angularly positioning said panel about an axis in its plane so that one angular position of said panel is in accordance with azimuth data relating to an object in space, and means for supplying to said panel range and height data relating to said object when the angular position of the panel corresponds to the azimuth angle of said object.

11. The combination of an electroluminescent disk comprising a base sheet on which are mounted in succession a group of *x* coordinate parallel conductive grids, an electroluminescent dielectric element, a group of *y* coordinate parallel conductive grids at right angles to the first-mentioned group, said groups defining a plurality of conductor crossings at which the intervening portion of the electroluminescent element can be caused to luminesce upon selection of an *x* coordinate grid and a *y* coordinate grid, means for rotatably mounting said disk, a range generator, a height generator, an *x* channel adapted when gated to couple the range generator to a selected *x* coordinate element, a *y* channel adapted when gated to couple the height generator to a selected *y* coordinate element, and an azimuth indicator for supplying azimuth data to the gates in the *x* and *y* channels to cause a point on the disk repetitively to luminesce upon each rotation of the disk when the angular position of the disk corresponds to the azimuthal indication of a selected target.

References Cited in the file of this patent

UNITED STATES PATENTS 2,967,905 Hirsch ---------------- Jan. 10, 1961

OTHER REFERENCES

Publication: "Crystal Ball" Plots 3–D Curves in Color, by J. R. Alburger, Electronic Industries and Tele-Tech, February 1957, pp. 50 to 53.